United States Patent [19]

Behchaar

[11] Patent Number: 5,185,999
[45] Date of Patent: Feb. 16, 1993

[54] HYDRAULIC BRAKE BOOSTER AND VALVE MEMBERS

[75] Inventor: Mohamed L. Behchaar, Mishawaka, Ind.

[73] Assignee: Allied-Signal Inc., Morristown, N.J.

[21] Appl. No.: 779,210

[22] Filed: Oct. 18, 1991

[51] Int. Cl.$^5$ ............................................. F16D 31/02
[52] U.S. Cl. .................................. 60/404; 60/405; 60/413; 60/582; 91/5
[58] Field of Search ..................... 91/5, 6, 28, 32, 33; 60/404, 405, 413, 582

[56] References Cited

U.S. PATENT DOCUMENTS

| | | | |
|---|---|---|---|
| 4,052,851 | 10/1977 | Brown | 60/404 |
| 4,121,421 | 10/1978 | Myers et al. | 60/584 |
| 4,212,166 | 7/1980 | Tang | 60/404 |
| 4,249,452 | 2/1981 | Brown | 91/6 |
| 4,281,585 | 8/1981 | Runkle et al. | 91/6 |

Primary Examiner—Edward K. Look
Assistant Examiner—F. Daniel Lopez
Attorney, Agent, or Firm—Larry J. Palguta; Ken C. Decker

[57] ABSTRACT

A hydraulic brake booster (10) includes a housing (12) which defines a pressure chamber (16) and a piston (18) within the housing (12) is movable in response to pressurized fluid within the pressure chamber (16) to effectuate a brake application. The piston (18) encloses a storage chamber (60) and forms a pair of passages (80, 90) communicating the storage chamber (60) with the pressure chamber (16). A valve member (100) is disposed within the first passage (80) in order to control communication between the storage chamber (60) and pressure chamber (16). The valve member (100) permits pressurized fluid within the pressure chamber (16) to be communicated to the storage chamber (60) in order to charge the storage chamber (60). The valve member (100) also permits high pressure fluid above a predetermined pressure level within the storage chamber (60) to be communicated to the pressure chamber (16). The second passage (90) includes a dump/charging valve (120) which can be opened by an operator actuator (50) to permit pressurized fluid to be communicated from the pressure chamber (16) to the storage chamber (60) for charging and, when insufficient pressure is present in the pressure chamber (16), is actuated by the operator actuator (40) such that higher pressure fluid in the storage chamber (60) is dumped into the pressure chamber (16) in order to assist in the displacement of the piston (18) and to effectuate a brake application.

4 Claims, 2 Drawing Sheets

HYDRAULIC BRAKE BOOSTER AND VALVE MEMBERS

The invention relates generally to a hydraulic brake booster, and in particular to a hydraulic brake booster with separate valve members for pressure charging and relief, and for providing emergency pressure.

Hydraulic brake boosters have been provided previously in many different configurations. Runkle et al. U.S. Pat. No. 4,281,585 illustrates a hydraulic brake booster having a piston which is movable in response to pressurized fluid in a pressure chamber to initiate a braking application. In order to conserve space and weight, the piston is hollow to substantially define a storage chamber within the piston. If the pressure of the pressurized fluid within the pressure chamber is insufficient to move the piston during braking, the storage chamber is communicated to the pressure chamber to assist in moving the piston, thereby providing a power assist to the braking application. Generally, the storage chamber is communicated to the pressure chamber when a spool valve within the brake booster fails to communicate pressurized fluid to the pressure chamber, either because of an inoperable pressure source or the spool valve becoming wedged in the brake booster housing. With the pressure source rendered inoperable, the communication of pressurized fluid to the pressure chamber from the storage chamber is required to provide a power assist to braking in order to bring a vehicle to a stop. Mizusawa et al. U.S. Pat. No. 4,773,223 discloses a hydraulic booster that utilizes a transverse pin to displace a spring biased valve rod in order to provide fluid pressure to operate the booster piston, with the booster not having any storage chamber and related valve devices. The valve member disclosed in Runkle et al. U.S. Pat. No. 4,281,585 provides a single assembly which permits charging of the storage chamber, relief of the storage chamber, and the provision of pressure from the storage chamber to the pressure chamber in the event of pressure source failure or failure of the control valve to move. However, it is highly desirable to provide a more easily manufacturable valve member in order to effect the same functions. Myers U.S. Pat. No. 4,084,304 discloses a method of constructing a valve for a hydraulic brake booster wherein an accumulator which effects a pressurized storage chamber is located externally of the piston of the hydraulic brake booster. The valve assemblies disclosed therein provide the three functions of charging, relief, and emergency pressure, in conjunction with the externally located accumulator and storage chamber. Both patents, Runkle et al U.S. Pat. No. 4,281,585 and Myers U.S. Pat. No. 4,084,304, disclose a single assembly or aligned assemblies providing in combination the three functions of charging, relief, and emergency pressure. It is highly desirable to provide the three functions comprising charging, relief, and emergency pressure by means of valves that are easily manufactured, are highly reliable, reduce the number of parts required for the functions, and which provide a longer operational life for the hydraulic brake booster.

The present invention provides solutions to the above problems by providing a hydraulic brake booster having a housing defining a pressure chamber, a piston mounted in the housing and movable relative to the housing in response to pressure in the pressure chamber, the piston defining and enclosing a storage chamber and a passage connecting said storage chamber with said pressure chamber, a valve member carried by the piston within said passage and operable to communicate pressurized fluid from the pressure chamber to the storage chamber via said passage and to communicate higher pressure within said storage chamber through the valve member to the pressure chamber, a control valve mounted in the housing, and an operator actuator cooperating with the control valve to communicate pressurized fluid to the pressure chamber, the improvement comprising a two-function valve disposed chamber and pressure chamber and actuatable by a pressure differential between the chambers to communicate pressurized fluid in the pressure chamber to the storage chamber and engageable by said operator actuator to communicate higher pressure in said storage chamber to said pressure chamber in the event sufficient pressure is not communicated to the pressure chamber during operation of the operator actuator, the two-function valve and valve member being disposed in substantially parallel alignment.

One way of carrying out the invention is described in detail below with reference to the drawings which illustrate an embodiment in which.

Figure 1:
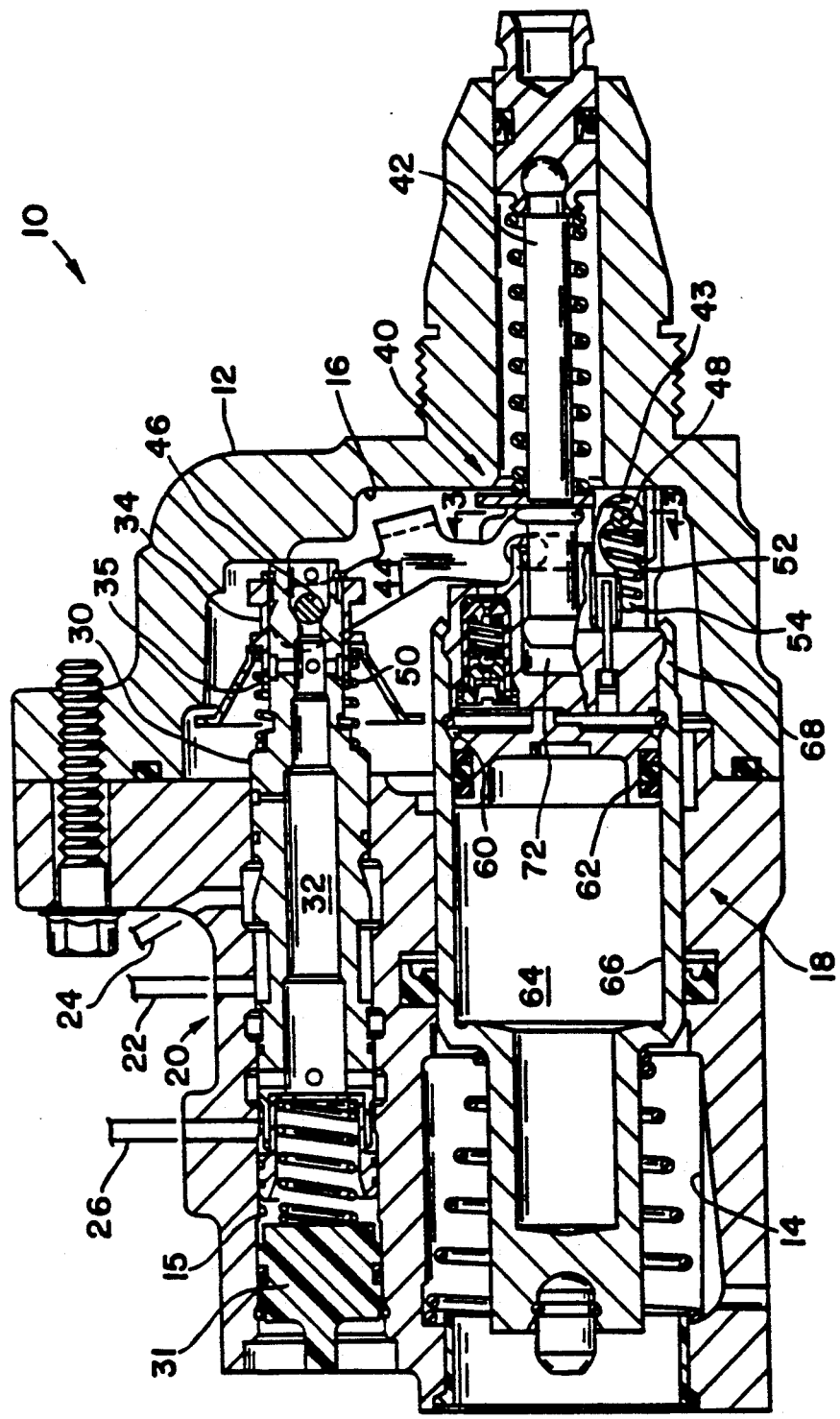
FIG. 1 is a side cross-sectional view of a hydraulic brake booster constructed in accordance with the present invention.

A hydraulic brake booster 10 provides a power assist during braking to increase the force supplied to a master cylinder in a vehicle, thereby assisting an operator in stopping the vehicle. In the hydraulic brake booster of FIG. 1, housing 12 includes a pair of bores 14 and 15 and substantially defines pressure chamber 16. Piston 18 located in bore 14 is movable relative to housing 12 in response to pressurized fluid within pressure chamber 16. A conventional master cylinder (not shown) connects with the left side of the housing so that movement of piston 18 causes the master cylinder to communicate brake fluid to wheel brakes (not shown) to initiate braking of the vehicle.

Control valve 20 is disposed within housing bore 15 and moves relative to the housing to cooperate with inlet 22, outlet 24, and return 26, in order to control communication of pressurized fluid to pressure chamber 16. The control valve preferably comprises spool valve 30 with passage 32 communicating with pressure chamber 16. Sleeve 34 carried by spool valve 30 is movable from a normal position to close passage 32.

Operator actuator 40 comprises input rod 42 and lever 44. The lever is pivoted about pin 46 on sleeve 34 and about pin 48 on piston 18. Sleeve 34 includes openings 35 which communicate with passage 32. Spring 50 biases sleeve 34 and pin 46 to one end of spool valve 30 and spring 52 biases pin 48 to one side of a transverse axially elongated aperture 54 on piston 18. A pair of pins 47 connect input rod 42 with lever 44. Lever 44 abuts a plunger 43 mounted on pin 48.

Piston 18 forms storage chamber 60 internally of piston 18. Diaphragm piston 62 separates storage chamber 60 from compressible medium 64 such that pressurized fluid communicated to storage chamber 60 compresses the medium to maintain storage chamber 60 under pressure. Piston 18 preferably comprises stepped cylindrical casing 66 terminating in end 68 which receives plug or end member 70. Plug 70 receives input rod 42 in blind bore 72 so that it is possible to manually move piston 18 to a braking position by urging input rod 42 into blind bore 72 until the input rod abuts the bottom of blind bore 72, whereupon further movement of the input rod transmits movement to piston 18.

In accordance with the present invention, end member or plug 70 includes a pair of separate passages 80 and 90. Passage 80 includes charging and relief valve 100. Charging and relief valve 100 comprises thermoplastic casing 102 having bore 103 and tapered edge 106 for engaging elastomeric ring 78. Thermoplastic plug 104 is received fixedly and sealingly within bore 103 and includes passage 108. Passage 108 in thermoplastic plug 104 terminates in valve seat 110 which receives sealingly metal ball valve 112. Ball valve 112 is biased by metal washer 114 which is in turn biased by spring 116 located within bore 103. Opposite ball valve 112 is end opening 107. Charging and relief valve 100 may slide longitudinally within passage 80 such that disengagement with elastomeric ring 78 permits fluid to flow around the outer surface of casing 102 and communicate with storage chamber 60. Likewise, higher fluid pressure within storage chamber 60 and lower fluid pressure within pressure chamber 16 causes casing 102 to engage sealingly elastomeric ring 78 such that, at a predetermined pressure level, high fluid pressure in storage chamber 60 causes ball valve 112 to disengage seat 110 and permit fluid pressure to flow from the storage chamber to the pressure chamber.

Figure 2:
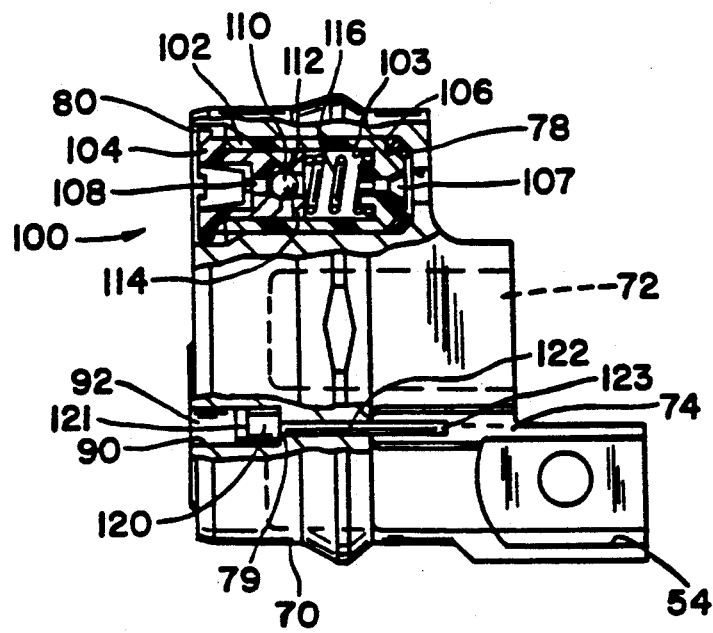
FIG. 2 is an enlarged side fragmentary cross-sectional view of a portion of the piston which includes the present invention.
Figure 3:
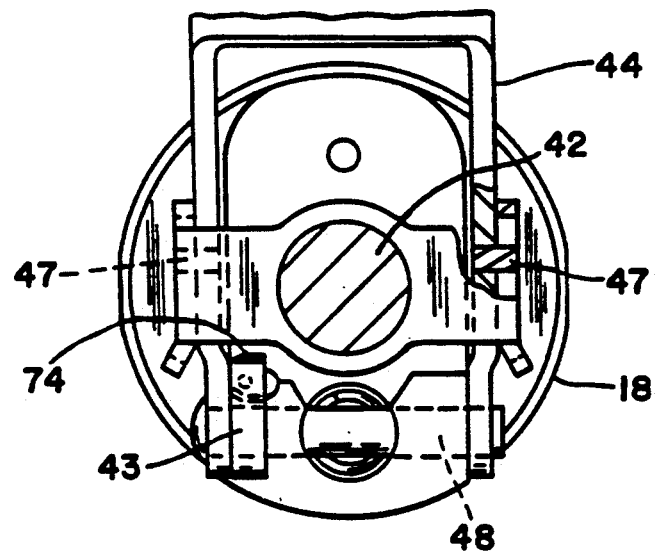
FIG. 3 is an end fragmentary cross-sectional view taken along view line 3—3 of FIG. 1.

Passage 90 comprises a longitudinal passage located within end member 70 and which includes enlarged diameter portion 92 receiving therein complementary shaped head 121 of dump/charging valve pin 120 (see FIG. 2). Dump/charging valve pin 120 includes longitudinally extending circular shaped shaft 122 received within passage 90 such that end 123 extends within laterally open recess 74 of end member 70. Operator actuator 40 includes plunger 43 which is shaped complementary with and received slidingly in recess 74. If insufficient pressure exists in pressure chamber 16, displacement of operator actuator 40 will move the plunger 43 slidingly along recess 74 and cause it to engage dump/charging valve pin 120 such that head 121 disengages from end member valve seat 79 and permit high pressure fluid in storage chamber 60 to be communicated with pressure chamber 16 and effectuate a braking application.

Hydraulic brake booster 10 operates in a conventional manner to provide a power assist to a braking application. For example, when input rod 42 is moved to the left to initiate braking, connecting pins 47 cause lever 44 to pivot about pin 48 thereby moving control valve 20 to open communication between inlet 22 and pressure chamber 16 via passage 32. Pressurized fluid communicated to pressure chamber 16 imparts a force on piston 18 to move the piston to the left, thereby actuating the master cylinder to communicate brake fluid to the wheel brakes, which effectuates a braking application. With pressurized fluid communicated to pressure chamber 16, storage chamber 60 is charged if the pressure within the pressure chamber is greater than the pressure within the storage chamber. The pressure differential across valve 100 causes casing 102 to move laterally away from elastomeric ring 78 and permit fluid to flow around casing 102, through passage 80, and to storage chamber 60. Depending on the pressure differential, dump/charging valve pin 120 and head 121 may move away from seat 79 so that fluid pressure can be communicated via passage 90 to storage chamber 60. If the pressure in pressure chamber 16 is less than that in storage chamber 60, and during braking the pressure of the pressurized fluid within pressure chamber 16 is insufficient to move piston 18, movement of input rod 42 causes pivoting lever 44 to move spool valve 30 into abutment with stop 31 and to move sleeve 34 relative to spool valve 30, thereby moving openings 35 and closing passage 32. Continued movement of input rod 42 pivots lever 44 about pin 46 and urges plunger 43 to move against dump valve pin 120. As the plunger engages shaft end 123 to disengage head 121 from valve seat 79, the pressurized fluid within storage chamber 60 is communicated via passage 90 to pressure chamber 16. Consequently, pressurized fluid is communicated from the storage chamber to the pressure chamber to create a force urging the piston to move to the left. Therefore, a power assist is provided during braking by the storage chamber, even though the control valve fails to communicate enough pressurized fluid to the pressure chamber or the source of fluid pressure fails.

If the pressurized fluid within storage chamber 60 is exhausted after a few brake applications without the control valve operating properly, a brake application is still possible, as continued movement of input rod 42 abuts the latter with the bottom of blind bore 72, so that movement of the input rod imparts movement to piston 18 to actuate the master cylinder.

When normal braking is terminated, spool valve 30 and sleeve 34 return to their normal positions to communicate pressure chamber 16 with return 26 via passage 32. Consequently, if the pressure of the pressurized fluid within storage chamber 60 increases due to heat or other means to a pressure above a predetermined level, the pressure differential across valve member 100 causes spring 116 to be compressed by ball 112/washer 114 and open the storage chamber to the pressure chamber in order to relieve the increased pressure in the storage chamber. Because the pressure chamber is in communication with return 26, the venting of increased pressure to the pressure chamber does not initiate braking, because the increased pressure communicated from the storage chamber to the pressure chamber is communicated to the return via passage 32.

I claim:

1. In a hydraulic brake booster having a housing defining a pressure chamber, a piston mounted in the housing and movable relative to the housing in response to pressure in the pressure chamber, the piston defining and enclosing a storage chamber and a passage connecting said storage chamber with said pressure chamber, a valve member carried by the piston within said passage and operable to communicate pressurized fluid from the pressure chamber to the storage chamber via said passage and to communicate higher pressure within said storage chamber through the valve member to the pressure chamber, a control valve mounted in the housing, and an operator actuator cooperating with the control valve to communicate pressurized fluid to the pressure chamber, the improvement comprising a two-function valve disposed in a second passage in said piston between the storage chamber and pressure chamber and actuatable by a pressure differential between the chambers to communicate pressurized fluid in the pressure chamber to the storage chamber and engageable by said operator actuator to communicate higher pressure in said storage chamber to said pressure chamber in the event sufficient pressure is not communicated to the pressure chamber during operation of the operator actuator, the two-function valve and valve member being disposed in substantially parallel alignment.

2. The hydraulic brake booster in accordance with claim 1, wherein the second passage includes a valve seat integral with an end member of said piston, the two-function valve including an enlarged head which sealingly engages said valve seat.

3. The hydraulic brake booster in accordance with claim 2, wherein the two-function valve includes a longitudinally extending, circular shaped shaft extending from said head and extending into a recessed area of said end member.

4. The hydraulic brake booster in accordance with claim 3, wherein the recessed area of said end member comprises a lateral recess which extends inwardly from a side of said end member so that a plunger of said operator actuator may slide in the recess.

* * * * *